(12) United States Patent
Zheltov et al.

(10) Patent No.: US 8,032,706 B2
(45) Date of Patent: Oct. 4, 2011

(54) METHOD AND APPARATUS FOR DETECTING A DATA ACCESS VIOLATION

(75) Inventors: Sergey N. Zheltov, Nizhny Novgorod (RU); Paul Petersen, Champaign, IL (US); Zhiqiang Ma, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 558 days.

(21) Appl. No.: 12/186,416

(22) Filed: Aug. 5, 2008

(65) Prior Publication Data

US 2010/0037025 A1 Feb. 11, 2010

(51) Int. Cl.
*G06F 12/00* (2006.01)
*G06F 9/44* (2006.01)

(52) U.S. Cl. ........ 711/118; 711/150; 711/152; 711/163; 717/126; 717/127; 717/131

(58) Field of Classification Search .................. 711/118, 711/150, 152, 156, 163, 168; 717/124, 126, 717/127, 131
See application file for complete search history.

(56) References Cited

U.S. PATENT DOCUMENTS

| | | | |
|---|---|---|---|
| 6,701,528 B1 | 3/2004 | Arsenault et al. | |
| 7,228,391 B2 * | 6/2007 | Silvera et al. | 711/152 |
| 7,516,446 B2 * | 4/2009 | Choi et al. | 717/128 |
| 7,539,979 B1 * | 5/2009 | Nir-Buchbinder | 717/131 |
| 7,549,150 B2 * | 6/2009 | Yu | 718/108 |
| 7,673,181 B1 * | 3/2010 | Lindo et al. | 714/38 |
| 7,711,931 B2 * | 5/2010 | Kissell | 712/226 |
| 7,849,297 B2 * | 12/2010 | Kissell | 712/228 |
| 7,861,118 B2 * | 12/2010 | Edwards et al. | 714/38 |
| 2003/0182515 A1 * | 9/2003 | Zahir | 711/141 |
| 2004/0025164 A1 | 2/2004 | Ma et al. | |
| 2005/0010729 A1 * | 1/2005 | Silvera et al. | 711/150 |
| 2007/0074213 A1 | 3/2007 | Ma et al. | |
| 2009/0077540 A1 | 3/2009 | Zhou et al. | |
| 2010/0192131 A1 * | 7/2010 | Dolby et al. | 717/126 |

FOREIGN PATENT DOCUMENTS

EP 0982658 1/2000

OTHER PUBLICATIONS

European Search Report Patent Application No. 09251884.4, Mailed May 7, 2010, 4 pages.
Xu, Min et al., "A "Flight Data Recorder" for Enabling Full-system Multiprocessor Deterministic Replay", ISCA '03, 1063-6897/03, (2003), 6 pages.
Official letter for European Patent Application No. 09251884.4, Mailed Aug. 18, 2010, 7 pages.
"AVIO: Detecting Atomicity Violations via Access Interleaving Invariants," 10 pages.
Notice of Preliminary Rejection for Korean Patent Application No. 10-2009-72057, Mailed Jan. 19, 2011, 5 pages.
Korean Intellectual Property Office, Notice of Preliminary Rejection mailed Jan. 19, 2011 in Korean patent application No. 10-2009-72057.

* cited by examiner

*Primary Examiner* — John Lane
(74) *Attorney, Agent, or Firm* — Trop, Pruner & Hu, P.C.

(57) ABSTRACT

Machine-readable media, methods, apparatus and system for detecting a data access violation are described. In some embodiments, current memory access information related to a current memory access to a memory address by a current user thread may be obtained. It may be determined whether a cache includes a cache entry associated with the memory address. If the cache includes the cache entry associated with the memory address, then, an access history stored in the cache entry and the current memory access information may be analyzed to detect if there is at least one of an actual violation and a potential violation of accessing the memory address.

21 Claims, 7 Drawing Sheets

METHOD AND APPARATUS FOR DETECTING A DATA ACCESS VIOLATION

BACKGROUND

Bugs in a parallel program, such as a multi-threaded program and a multi-processed program, may be one of the most difficult to test and diagnose among all software bugs. There are some types of bugs in the parallel program, such as a data race and a data access atomicity violation. The data race may, for example, occur when two threads access, at least one of which being a write, the same data in a memory concurrently without proper synchronization. The data access atomicity violation may, for example, occur when a code region is executed in a non-atomic way in opposite to an expectation of executing it as an atomic region. Algorithm for the data access atomicity detection may depend on an observation called access interleaving invariant that is a good indication of programmers' assumptions about the atomicity of a certain code region.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for detecting a data access violation. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Figure 1:
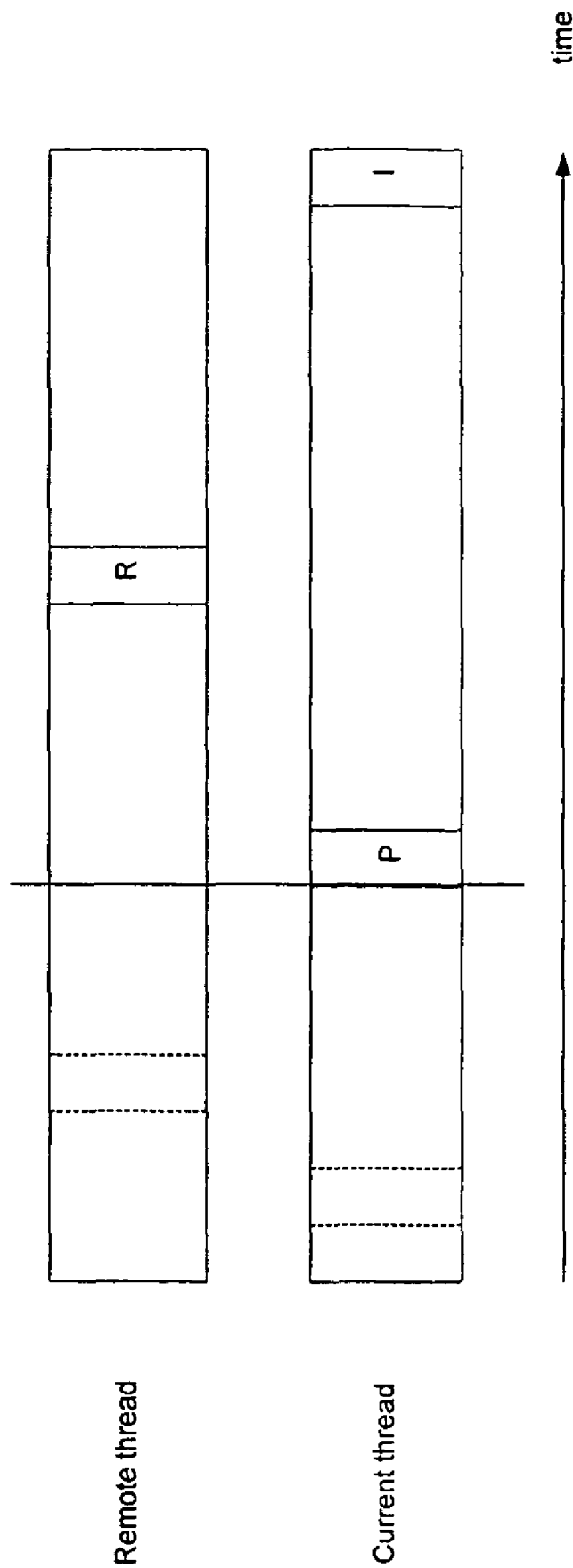
FIG. 1 illustrates an embodiment of a data access interleaving.

FIG. 1 illustrates an embodiment of a data access interleaving. As illustrated, two different threads, i.e., a current thread and a remote thread which may be another thread different from the current thread, may access the same data in a memory, for example, reading the data from the memory and/or writing the same data into the memory. I-instruction may represent a current data access instruction from the current thread. P-instruction may represent a previous data access instruction from the current thread that is closest to the I-instruction in terms of the time. R-instruction may represent a data access instruction from the remote thread that interleaves with data accesses by the current thread. In other words, R-instruction may represent a remote data access instruction between the I- and P-instructions from the current thread in term of the time.

In a conventional method of detecting a data access violation, e.g., a data access atomicity violation, three instructions may be considered, i.e., I-instruction, P-instruction and R-instruction. The following table may show eight types of the data access interleavings, wherein "R" represents read and "W" represents write.

| | Interleaving | | | | |
|---|---|---|---|---|---|
| Current Thread (P) | Remote Thread (R) | Current Thread (I) | Case# | serializability | Problems |
| R | R | R | 0 | serializable | None |
| W | R | R | 1 | serializable | None |
| R | W | R | 2 | unserializable | The interleaving write makes the two reads have different views of the same memory location |

-continued

| Current Thread (P) | Remote Thread (R) | Current Thread (I) | Case# | serializability | Problems |
|---|---|---|---|---|---|
| W | W | R | 3 | unserializable | The local read does not get the local result it expects |
| R | R | W | 4 | serializable | None |
| W | R | W | 5 | unserializable | Intermediate result that is assumed to be invisible to other threads is read by a remote access |
| R | W | W | 6 | unserializable | The local write relies on a value from the preceding local read that is then overwritten by the remote write |
| W | W | W | 7 | serializable | None |

Cases 2, 3, 5 and 6 show different types of the data access atomicity violations.

Figure 2:
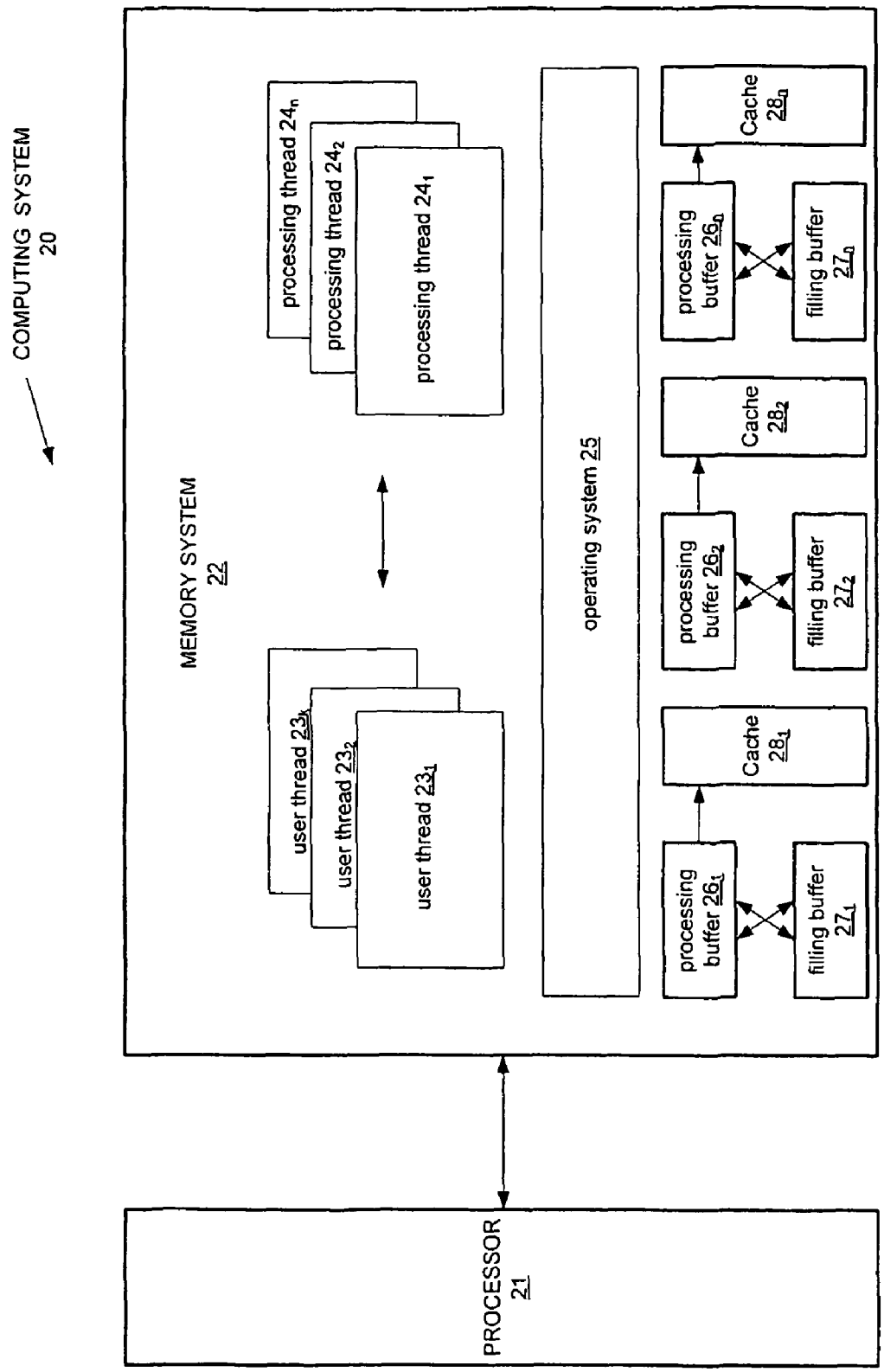
FIG. 2 illustrates an embodiment of a computer platform having an apparatus to detect a data access violation.

FIG. 2 illustrates a computing platform having an apparatus for detecting a data access violation, such as an atomicity violation. It should be appreciated that the computing platform of FIG. 2 may be able to detect other types of data access violations.

Computing platform 20 may comprise one or more processors 21, memory 22, and possibly other components for data transceiving and processing (not shown in FIG. 2). Examples of the computing platform may comprise mainframe computers, mini-computers, personal computers, workstations, portable computers, laptop computers, clusters, or other device capable for data transceiving and processing.

Processors 21 are communicatively coupled to various components (e.g., memory 22) via one or more buses such as a processor bus. Processors 21 may be implemented as an integrated circuit (IC) with one or more processing cores that may execute codes under a suitable architecture, for example, including Intel® Xeon™, Intel® Pentium™, Intel® Itanium™, Intel® Core architectures, available from Intel Corporation of Santa Clara, Calif.

Memory 22 may store codes to be executed by processor 21. In an embodiment, memory 22 may store codes for detecting the data access violation. As shown, two groups of threads may run over operating system 25, i.e., user threads $23_1$ to $23_k$ and processing threads $24_1$ to $24_n$. A user thread may access memory 22 for data, e.g., read/write the data from/to memory 22, with an unserializable interleaving from another user thread accessing the memory for the same data, as illustrated in the above table, in which case a data access violation may occur. Processing threads $24_1$-$24_n$ may detect the data access violation by the user threads $23_1$-$23_k$.

In an embodiment, each of processing threads $24_1$-$24_n$ may have a plurality of buffers and a cache, such as processing buffer $26_1$, filling buffer $27_1$ and cache $28_1$ for processing thread $24_1$, processing buffer $26_2$, filling buffer $27_2$ and cache $28_2$ for processing thread $24_2$, and so on. Caches $28_1$-$28_n$ may be software caches managed by a variety of software. Examples of the software cache may include a disk cache that is usually managed by operating system 25. It should be appreciated that other technologies may implement other embodiments. For example, the processing threads may have any number of buffers each. For another example, the caches may be hardware caches, such as processor caches. For another example, one processing thread may be used in place of multiple threads.

In an embodiment, the user thread (e.g., user thread $23_1$) may access a number of contiguous memory locations for the data, in which each memory location storing each piece of the data may have an address. A memory address may either refer to an address of the memory location storing a piece of the data, or an address of the contiguous memory locations storing the complete data or different data, e.g., an address of a starting memory location of the contiguous memory locations.

When the user thread accesses the memory for the data, e.g., a memory location for a piece of the data or contiguous memory locations storing the complete data or different data, it may select a filling buffer from the plurality of filling buffers $27_1$-$27_n$ associated with processing threads $24_1$-$24_n$ to store memory access information related to the memory access, which may be used later for the data access violation detection and/or other purposes. In an embodiment, the memory access information may comprise one or more from a group including the memory address of the memory location or the contiguous memory locations, data length, time information (e.g., time stamp or time indicator) and type (e.g., read or write) of the memory access, memory access length, identifier of the user thread, and other information useful for the data access violation detection and/or other purposes. The memory access information may be in the form of data and/or instruction. The user thread may select the filling buffer based upon the memory address.

Figure 3A:
FIGS. 3a and 3b illustrates two embodiments of a memory address.
Figure 3B:
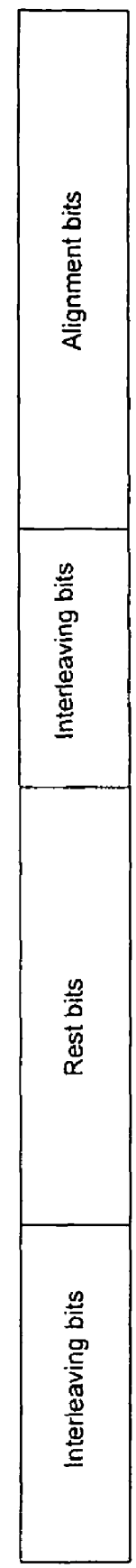

FIG. 3a illustrates an embodiment of the memory address. The memory address may comprise different portions, such as interleaving bit(s), alignment bit(s), and rest bit(s). It should be appreciated that other technologies may implement other embodiments for the memory address structure of FIG. 3a. For example, positions of the different portions may be changeable. For another example, a portion of the memory address (e.g., interleaving bits) may be split into several sub-portions, as illustrated in FIG. 3b.

The interleaving bit(s) of the memory address may be used to identify a filling buffer from the plurality of filling buffers $27_1$-$27_n$. For example, there are four filing buffers $27_1$-$27_4$ for four processing threads $24_1$-$24_4$, that may be identified as 00, 01, 10, and 11. In such case, the interleaving bits may comprise two bits in order to identify one from the four filling buffers. In an embodiment, the user thread may determine whether the memory address is within a memory area of interest. If so, the user thread may add the memory access information related to accessing the memory address into the filling buffer that the memory address identified. Otherwise, the user thread may skip the memory address. The memory area may be predetermined so that a violation related to accessing to the memory area may be detected.

Alignment bit(s) may indicate how big a memory region is, in which memory access information of the memory region may be stored in a same filling buffer (e.g., filling buffer $27_1$) and then be loaded to a cache entry of a cache (e.g., cache $28_1$) associated with the filling buffer at a caching operation. Therefore, the alignment bits may further indicate the cache entry size. In an embodiment, the memory region may comprise contiguous memory locations storing a complete data, in which different memory locations may store different pieces of the data. In another embodiment, the contiguous memory locations may store different data. In order to improve performance, the memory access information related to accessing the memory region that the alignment bit(s) indicates may be stored in the same filling buffer.

The following may give an example of the memory addresses:
0000, 0001, 0010, 0011,
0100, 0101, 0110, 0111,
1000, 1001, 1010, 1011,
1100, 1101, 1110, 1111.

In an embodiment, second bit from the left of the memory address may be the interleaving bit to identify a filling buffer from the plurality of filling buffers, third and fourth bits from the left of the memory address may be alignment bits to indicate how big the memory region is, in which the memory access information of the memory region may be stored in the same filling buffer. It can be seen from the above that memory access information corresponding to first and third lines of the memory addresses may go to a same filling buffer, while memory access information corresponding to second and fourth lines of the memory addresses may go to another same filling buffer. In another embodiment, different memory addresses may be accessed by different user threads.

With the above scenario, conflicts among user threads on memory access information logging may be avoided by storing memory access information related to accessing different memory regions into different filling buffers and using specific bit(s) of the memory address as an index to select a specific filling buffer among the plurality of filling buffers.

Referring back to FIG. 2, when the filling buffer is full, its associated processing thread may switch a processing buffer of the processing thread with the filling buffer so that the processing buffer may perform as a new filling buffer and the filling buffer may perform as a new processing buffer. Then, the processing thread may input the memory access information from the new processing buffer into the associated cache. For example, processing thread $24_1$ may switch filling buffer $27_1$ with processing buffer $26_1$, and then input the memory access information from the new processing buffer (i.e., filling buffer $27_1$) to cache $28_1$.

With the above scenario, conflicts between the user threads and the processing thread on the filling buffer access may be avoided by separating the filling buffer from the processing buffer.

Figure 4A:
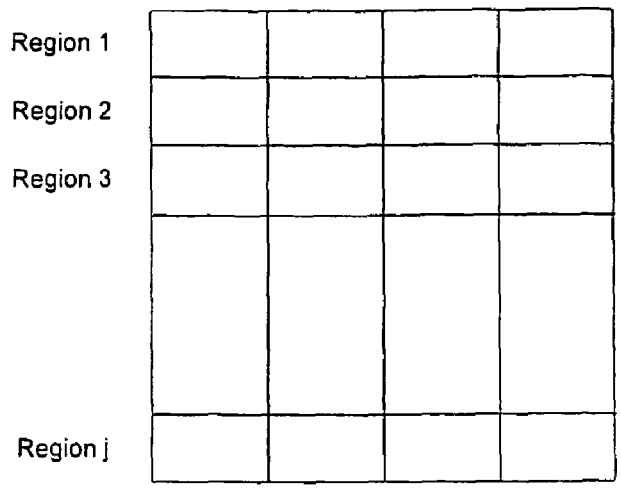
FIGS. 4a and 4b respectively illustrate embodiments of a cache entry and of a cache page.

FIG. 4a illustrates an embodiment of a cache. The cache may comprise a plurality of cache entries. In an embodiment, each cache entry may store an access history of accessing a memory region, in which the access history may comprise the memory access information related to accessing the memory region by one or more of user threads $23_1$-$23_k$. The memory region may comprise a number of contiguous memory locations indicated by alignment bit(s) of each memory address associated with each memory location. For example, if the memory address comprises two alignment bits, then the memory region may have 4 contiguous memory locations.

In an embodiment, the memory region may store a complete data, and the cache entry may store a history of accessing the data from/to the memory by user threads $23_1$-$23_k$ and probably other information. In another embodiment, the memory region may store different data, and the cache entry may store a history of accessing different data from/to the memory by user threads $23_1$-$23_k$. The memory access information may comprise one or more from a group including an identifier of the user thread accessing the memory region, the memory address that the user thread accesses, time information (e.g., time stamp or time indicator) and type (e.g., read or write) of the memory access, memory access length, data length and other information useful for the violation detection later and/or other purposes.

Various embodiments may be implemented to link the memory access information stored in the processing buffer with the access history and probably other information stored in the cache. In an embodiment, the memory address of the memory access information may be used as a key to link the processing buffer data with the cache data. For example, it may be determined which memory region the memory address is within, so that the memory access information may be input from the processing buffer to a cache entry associated with the memory region. For another example, each cache entry of the cache may be identified with specific bit(s) of the memory address, e.g., rest bits and probably interleaving bits of the memory address as shown in FIG. 3, so that to which cache entry the memory access information from the processing buffer should go may be determined by the rest bit(s) and probably the interleaving bit(s) of the memory address.

The cache may update its stored data via various cache replacement algorithms, for example, least recently used (LRU) algorithm and least frequently used (LFU) algorithm. In an embodiment, according to the LRU algorithm, the cache may discard some or all of the stored data associated with a user thread that least recently accesses the memory, and/or may discard a cache entry that is least recently accessed for the memory access information logging. In another embodiment, according the LFU algorithm, the cache may discard some or all of the stored data associated with a user thread that least frequently accesses the memory, and/or may discard a cache entry that is least frequently accessed for the memory access information logging. The memory access information stored in the processing buffer may be referred in order to determine access frequencies for the LRU algorithm and/or the LFU algorithm.

In an embodiment, not all of the memory access information would be input from the processing buffer to the cache. Instead, only the memory access information related to a memory area of interest may be input to the cache.

With the above scenario, the cache may be able to meet the storage requirement by selectively storing the memory access information, rather than storing all of the memory access information for the violation detection later. Further, since data could be cached in a unit of multiple bytes, rather than byte by byte as the conventional memory access, the memory access information related to several memory accesses may be cached from the processing buffer to the cache at one time. For example, the memory access information related to accessing the memory region indicated by the alignment bit(s) may be cached at one time.

Various embodiments may implement other modifications and variations on the cache as shown in FIG. 4a. In an embodiment, a cache entry may store the access history of accessing one or more memory locations storing a piece or pieces of data, rather than the complete data. In an embodiment, a cache entry may store the access history of accessing more than one memory regions. In another embodiment, the access history of accessing one memory region may be stored in more than one cache entries. In yet another embodiment, the memory access information in the processing buffer may not be identical to the memory access information in the cache. In other words, the processing thread may modify the memory access information from the processing buffer before caching them. For example, information related to consecutive memory accesses for the same data by the same user thread may be consolidated before caching them. It should be appreciated these are exemplary embodiments and embodiments may selectively incorporate various disclosed features.

Figure 4B:
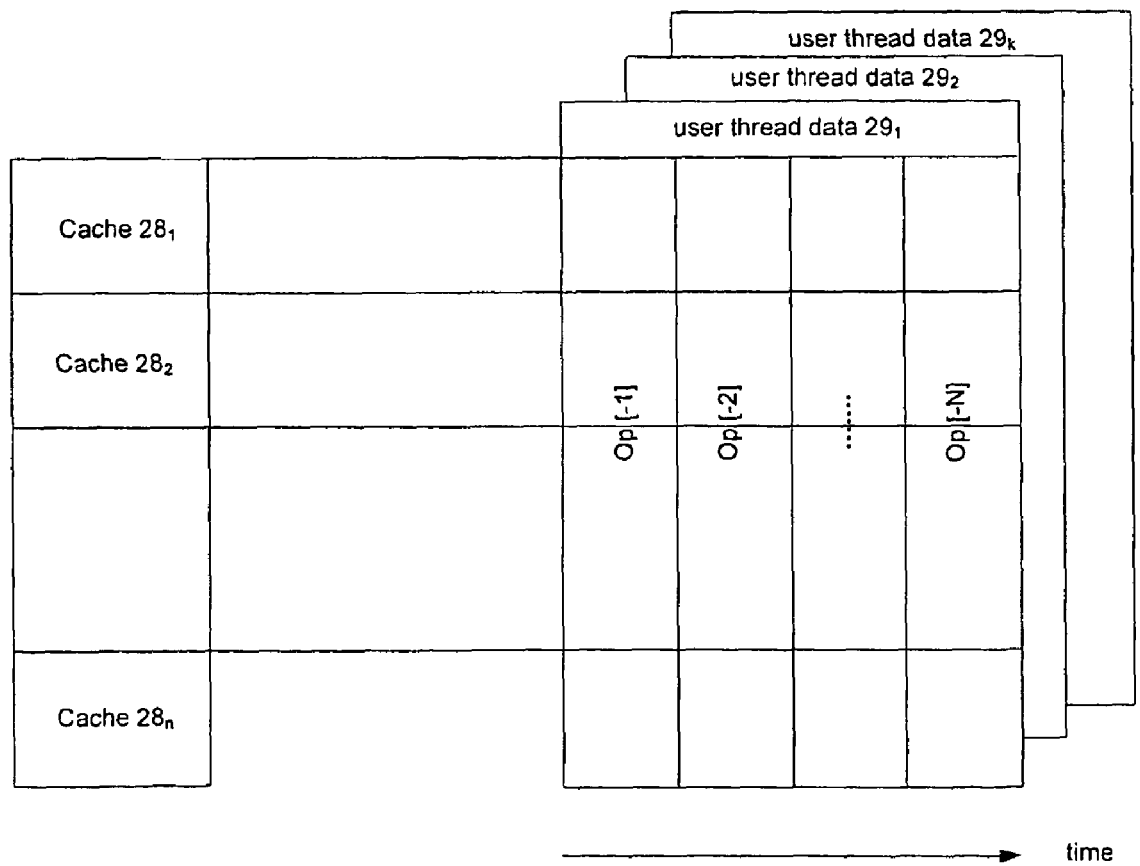

FIG. 4b illustrates an embodiment of cache pages. Information stored in caches $28_1$-$28_n$ may be organized into several pages, as shown on the right side of FIG. 4b. Each page may store a memory access history for each user thread, such as a page for user thread $23_1$ (user thread data $29_1$), a page for user thread $23_2$ (user thread data $29_2$), etc. Since each of caches $28_1$-$28_n$ may store access information related to a certain memory area identified by the interleaving bit(s) of the memory address, a cache page may include memory access information from different caches, as illustrated in FIG. 4b.

In an embodiment, a processing thread (e.g., $24_1$) may retrieve memory access information from a processing buffer (e.g., $26_1$), for example, memory access information related to accessing a memory address by a user thread (e.g., user thread $23_1$), and then retrieve the memory address from the memory access information. The processing thread may further determine whether its associated cache (e.g., cache $28_1$) has a cache entry storing access history related to the memory address. If so, the processing thread may analyze the access history stored in the cache entry and the memory access information retrieved from the processing buffer to determine if there is a violation related to accessing the memory address.

Since the access history stored in the cache entry may comprise memory access information associated with any of the user threads that may access the memory address within a period (e.g., a cache replacement period), the processing thread may be able to detect not only an actual violation, as what conventional method can do, but also a potential violation. For example, the violation (either actual violation or potential violation) may refer to an interruption to data access atomicity for a thread. Hereinafter, the thread whose atomicity may be interrupted may be called as a current thread.

Figure 5:
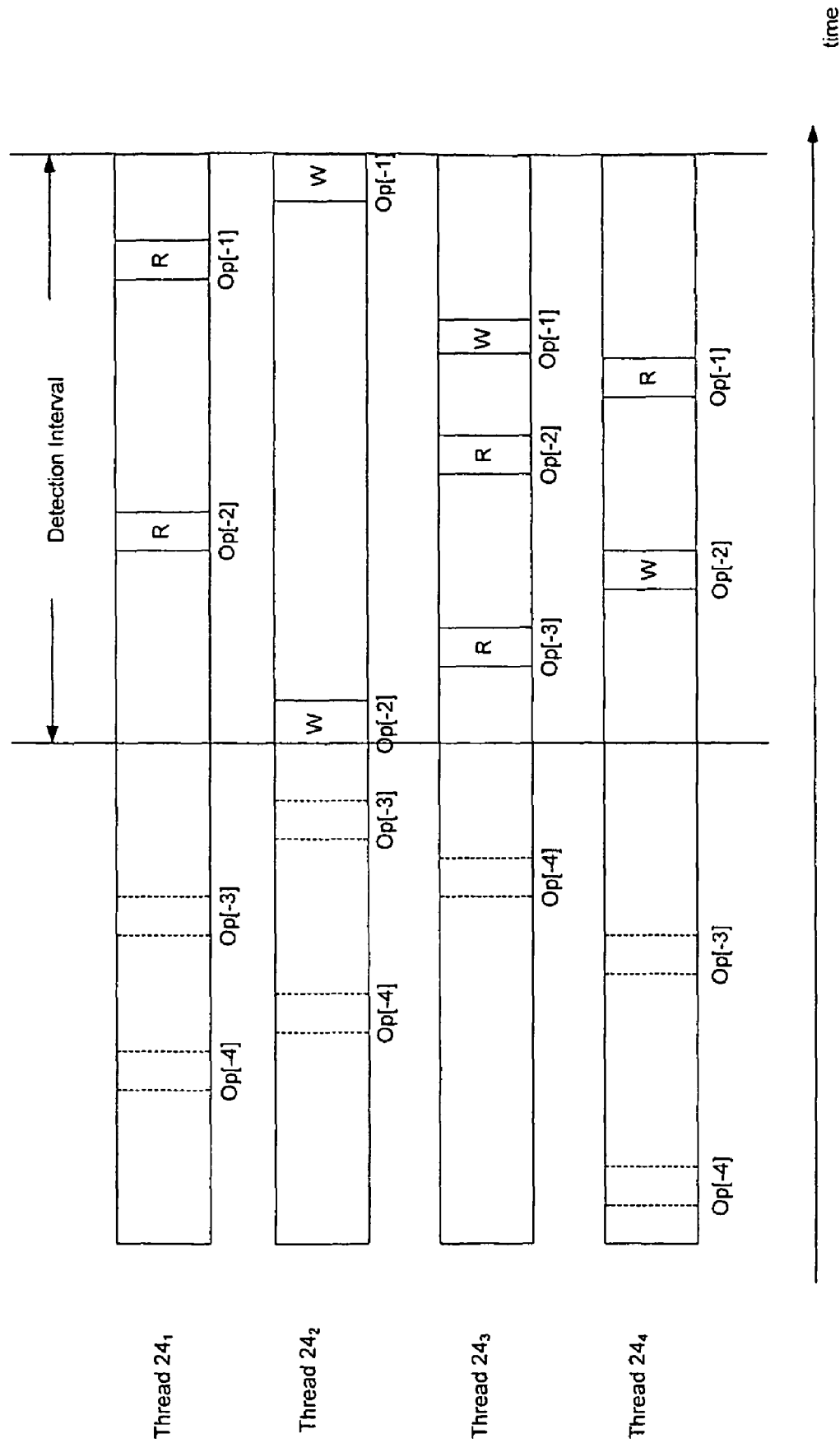
FIG. 5 illustrates an embodiment of actual and potential data access violations.

FIG. 5 illustrates an embodiment of actual and potential violations. As illustrated, thread $24_2$ may be the current thread whose atomicity may be interrupted by interleaving accesses from remote threads, e.g., threads $24_1$, $24_3$ and $24_4$. The current memory access information retrieved by the processing thread may be related to a current memory access by thread $24_2$. In that case, the processing thread may determine a detection interval, e.g., a time interval between a most recent previous memory access time by thread $24_2$ and the current memory access time by thread $24_2$. For instance, as shown in FIG. 5, the op[−1] "W" (i.e., write type) memory access of thread $24_2$ may be the current memory access, and its corresponding time may indicate the current memory access time, while the op[−2] "W" memory access of thread $24_2$ may be the most recent previous memory access, and its corresponding time may indicate the most recent previous memory access time.

Then, the processing thread may analyze the access history stored in the cache entry associated with the memory address, e.g., the access history by the remote threads (i.e., thread $24_1$, $24_3$ and $24_4$), to detect if there are any interleaving accesses by the remote threads during the detection period. If so, the processing thread may detect whether the interleaving access(es) makes up an actual violation or a potential violation. In an embodiment, the processing thread may detect if the interleaving access makes a data access violation, for example, by using the above table for the data access atomicity violation. If so, the processing thread may determine the interleaving access makes the actual violation if its access time is closest to the current memory access time, otherwise the processing thread may determine the interleaving access makes the potential violation. However, if only one interleaving access is detected to make up the data access violation, then the one interleaving access may be the actual violation.

For example, as shown in FIG. 5, five interleaving accesses may make up the data access violation, i.e., "op[−1] R" and "op[−2] R" accesses by thread $24_1$, "op[−2] R" and "op[−3] R" accesses by thread $24_3$ and "op[−1] R" access by thread $24_4$, in which the "op[−1] R" access by thread $24_1$ may make the actual violation, and the rest may make the potential violations.

However, if the processing thread cannot find from its associated cache a cache entry storing the access history related to the memory address, the processing thread may determine whether to add the memory access information into the cache or skip the memory access information. In response to adding the memory access information, the processing thread may obtain a blank cache entry to store access history associated with the memory address of the memory access information, and then add the memory access information into the blank cache entry. In response to skipping the memory access information, the processing thread may continue to retrieve next memory access information from the processing buffer and operate the next memory access information as stated above.

It should be appreciated that the memory address in the above process may refer to an address of a memory location storing a piece of data, or an address (e.g., starting address) of contiguous memory locations storing a complete data or different data.

Figure 6:
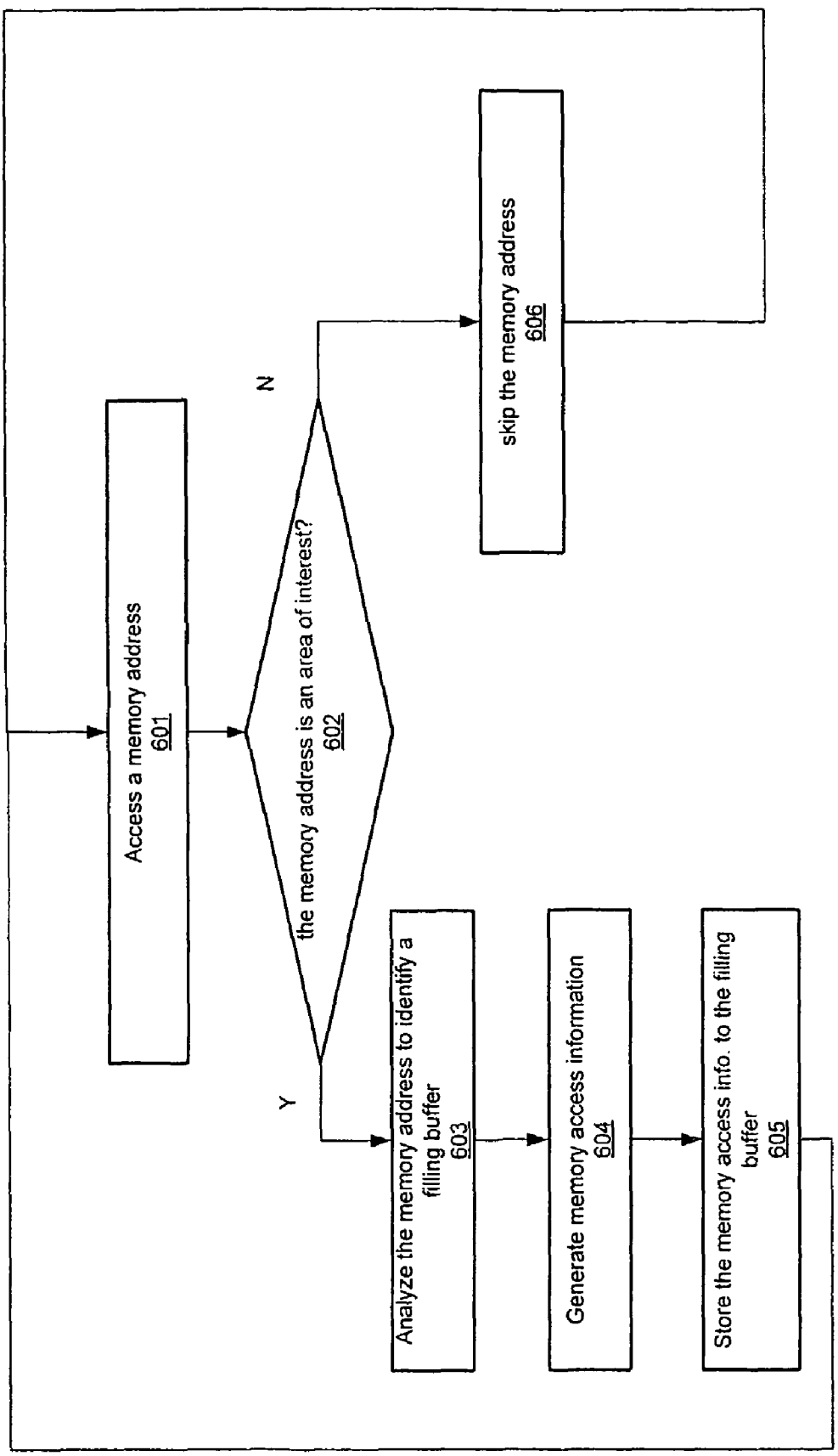
FIG. 6 illustrates an embodiment of a method of storing memory access information.

FIG. 6 illustrates an embodiment of storing memory access information. In block 601, a user thread (e.g., user thread $23_1$) may access a memory address. As stated above, the memory address may refer to an address of a memory location storing a piece of data. Alternatively, the memory address may be regarded as an address (e.g., starting address) of contiguous memory locations storing a complete data or different data. In block 602, the user thread or other device may determine whether the memory address is in an area of interest. If so, the user thread or other device may analyze the memory address to identify a filling buffer from a plurality of filling buffers (e.g., filling buffers $27_1$-$27_n$) associated with a plurality of processing threads (e.g., threads $24_1$-$24_n$) based upon the memory address, in block 603. As stated above, the memory address may comprise different portions, such as interleaving bit(s), alignment bit(s) and rest bit(s). The interleaving bit(s) may be used to identify the filling buffer from the plurality of filling buffers. In an embodiment, each filling buffer may have an identifier made up of one or more bits. In that case, the user thread or other device may analyze the interleaving bit(s) of the memory address in block 603.

Then, in block 604, the user thread or other device may generate memory access information related to the memory access. In an embodiment, the memory access information may comprise one or more from a group comprising the memory address, time information (e.g., time stamp or time indicator) and type (e.g., read or write) of the memory access, memory access length, identifier of the user thread, data length, and/or other information useful for a violation detection later or other purposes. In block 605, the user thread may store the memory access information to the filling buffer identified in block 603.

However, if the memory address is not in the area of interest, then in block 606, the user thread or other device may skip the memory address processing. It should be appreciated that the above process is applicable for all of the user threads $23_1$-$23_k$.

Various embodiments may implement other modifications and variations on the method of FIG. 6. In an embodiment, besides determining whether the memory address is within a predetermined area of interest in block 602, the user thread or other device may further determine whether there is a filling buffer identified by the memory address. If there is the filling buffer, the user thread or other device may store the memory access information into the filling buffer, otherwise, the user thread or other device may skip the memory address processing.

Figure 7:
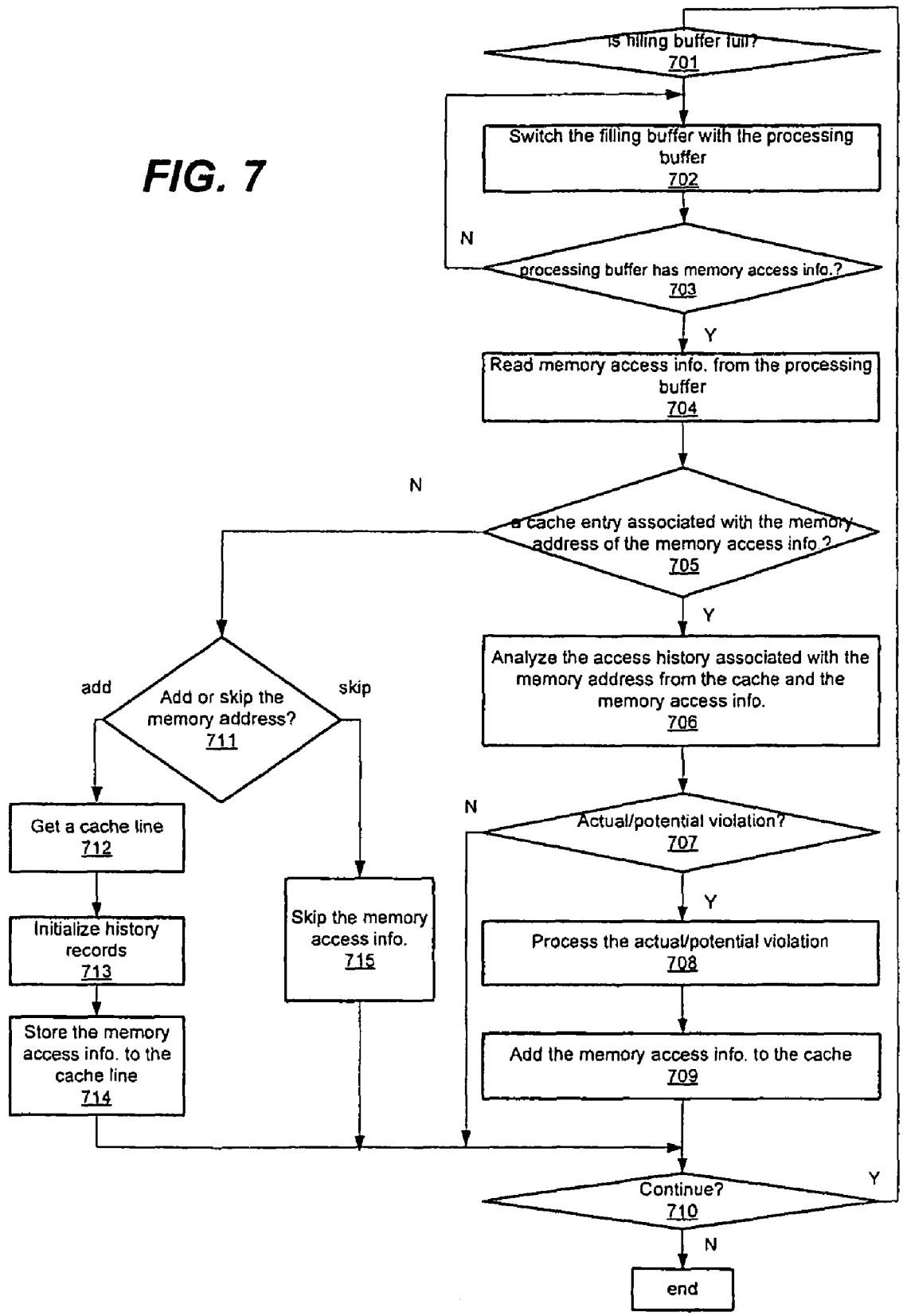
FIG. 7 illustrates an embodiment of detecting a data access violation.

FIG. 7 illustrates an embodiment of detecting a data access violation. In block 701, a processing thread (e.g., thread $24_1$) or other device may detect if its associated filling buffer (e.g., buffer $27_1$) is full. If full, the processing thread or other device may switch the filling buffer with its associated processing buffer (e.g., buffer $26_1$) in block 702, so that the processing buffer may act as a new filling buffer, and the filling buffer may act as a new processing buffer. In block 703, the processing thread or other device may determine if the acting processing buffer, i.e., the new processing buffer, has memory access information. If so, then in block 704, the processing thread or other device may read the memory access information related to a memory access from the processing buffer (i.e., the acting processing buffer).

In block 705, the processing thread or other device may determine if its associated cache (e.g., cache $28_1$) has an entry related to a memory address of the memory access information. In an embodiment, the cache may comprise a plurality of cache entries, in which each cache entry may store access history of accessing a memory address and probably other information. In an embodiment, the memory address may refer to a memory location storing a piece data. In another embodiment, the memory address may refer to an address (e.g., a starting address) of contiguous memory locations storing a complete data or different data.

In response that the cache has a cache entry associated with the memory address of the memory access information read from the processing buffer, the processing thread or other device may analyze the access history stored in the cache entry and the memory access information to detect if there is a data access violation for a user thread recorded in the memory access information to access the memory address, in block 706. Here, the user thread may be referred as a current user thread.

In an embodiment, the processing thread or other device may determine a detection interval, and then determine if there is an interleaving access by a remote user thread (e.g., a user thread other than the current user thread) during the detection interval. In an embodiment, the processing thread or other device may determine a time period between a current memory access time recorded in the memory access information read from the processing buffer and a most recent previous memory access time recorded in the access history as the detection interval. The most recent previous memory access time may represent the time of a memory access by the current thread that happens before but is closest to the current memory access time, based upon the access history.

In block 707, the processing thread or other device may determine if there is an actual data access violation and/or a potential data access violation for the current user thread. In an embodiment, the processing thread or other device may detect if there is a data access violation for the current thread. If so, the processing thread or other device may detect if the data access violation is the actual violation or the potential violation. In an embodiment, if there is only one data access violation during the detection interval, then the data access violation may be determined as the actual violation. However, if there is more than one data access violations during the detection interval, then the data access violation that happens closest to the current memory access time of the current user thread may be determined as the actual violation, and the rest data access violation(s) may be determined as potential violation(s).

If there is an actual/potential violation, then the processing thread or other device may process the actual/potential violation in block 708. In an embodiment, information about the detected violations may be stored for further analysis or reported to a user. It should be appreciated that operation of block 708 may be omitted. Then, the processing thread may or other device add the memory access information read from the processing buffer to the cache entry associated with the memory address of the memory access information, in block 709. It should be appreciated that operation of block 709 may be performed after other blocks, such as block 705.

If it is determined in block 705 that there is no cache entry in the cache that is associated with the memory address of the memory access information, then in block 711, the processing thread or other device may determine whether to add or skip the memory access information. In an embodiment, the processing thread or other device may make the decision of block 711, at least in part, based upon whether the memory address is within a memory area of interest. In response to adding the memory access information, the processing thread may obtain a blank cache entry from the cache in block 712, initialize cache records in block 713 and add the memory access information into the blank cache entry in block 714. In response to skipping the memory access information, the processing thread or other device may ignore the memory access information and continue to read next memory access information from the processing buffer, in block 715.

Although the present invention has been described in conjunction with certain embodiments, it shall be understood that modifications and variations may be resorted to without departing from the spirit and scope of the invention as those skilled in the art readily understand. Such modifications and variations are considered to be within the scope of the invention and the appended claims.

What is claimed is:

1. A method, comprising:
    generating current memory access information related to a current memory access to a memory address by a current user thread;
    storing the current memory access information in a first buffer associated with a first processing thread by the current user thread based on a portion of the memory address;
    switching the first buffer with a second buffer associated with the first processing thread by the first processing thread when the first buffer is full;
    determining if a cache includes a cache entry associated with the memory address; and if the cache includes the cache entry associated with the memory address, then analyzing an access history stored in the cache entry and the current memory access information to detect if there is at least one of an actual violation and a potential violation of accessing the memory address.

2. The method of claim 1, wherein the access history includes memory access information related to a plurality of memory accesses to the memory address, each of the plurality of memory accesses performed by one of a plurality of user threads, wherein the memory access information related to a memory access of the plurality of memory accesses includes one or more from a group comprising time information of the memory access, type of the memory access, memory access length, an identifier of a user thread of the plurality of user threads performing the memory access, and the memory address.

3. The method of claim 1, wherein the analyzing further includes:
   determining if the access history includes a previous memory access information related to a previous memory access to the memory address by the current user thread; and
   if the memory access information includes the previous memory access information, then determining a detection interval lasting from a previous access time of the previous memory access until a current access time of the current memory access.

4. The method of claim 1, wherein the analyzing further includes:
   detecting the actual violation if the access history shows a remote memory access to the memory address by a remote user thread at a remote access time during a detection interval, the remote memory access causes a violation of accessing the memory address for the current user thread and the remote access time is the most recent time that the memory address is accessed based upon the access history; and
   detecting the potential violation if the access history shows a remote memory access to the memory address by a remote user thread at a remote access time during a detection interval, the remote memory access causes a violation of accessing the memory address for the current user thread and the remote access time is not the most recent time that the memory address is accessed based upon the access history.

5. The method of claim 1, further comprising: if the cache includes the cache entry associated with the memory address, then adding the current memory access information to the cache entry.

6. The method of claim 1, further comprising: if the cache does not include the cache entry associated with the memory address, then
   finding another cache entry of the cache and storing the current memory access information into the another cache entry, if the memory address is within a predetermined memory area; and
   skipping the current memory access information, if the memory address is not within the predetermined memory area.

7. The method of claim 1, wherein the memory address comprises at least a bit to identify the second buffer.

8. A system, comprising:
   a plurality of user threads to access a memory;
   a processing thread;
   a cache associated with the processing thread; and
   a first buffer associated with the processing thread;
   a second buffer associated with the processing thread, wherein the second buffer is to store memory access information related to access the memory by the plurality of user threads, and the processing thread is further to switch the second buffer with the first buffer if the second buffer is full;
   wherein a cache entry of the cache is to store an access history comprising memory access information related to a plurality of memory accesses to a memory address, each of the plurality of memory accesses performed by one of the plurality of user threads.

9. The system of claim 8, wherein the memory access information related to a memory access of the plurality of memory accesses comprises one or more from a group including time information of the memory access, type of the memory access, memory access length, an identifier of a user thread of the plurality of user threads performing the memory access, and the memory address.

10. The system of claim 8, wherein the cache is a software cache.

11. The system of claim 8, wherein the processing thread is further to
    obtain, from the first buffer, current memory access information related to a current memory access to the memory address by a current user thread of the plurality of user threads;
    determine if the cache includes a cache entry associated with the memory address; and
    if the cache includes the cache entry associated with the memory address, then to analyze that access history stored in the cache entry and the current access information to detect if there is at least one of an actual violation and a potential violation.

12. The system of claim 11, wherein the processing thread is further to:
    determine if the access history includes previous memory access information related to a previous memory access to the memory address by the current user thread; and
    if the access history includes the previous memory access information, then to determine a detection interval lasting from a previous access time of the previous memory access until a current access time of the current memory access.

13. The apparatus of claim 11, wherein the processing thread is further to:
    detect the actual violation if the access history shows a remote memory access to the memory address by a remote user thread of the plurality of user threads at a remote access time during a detection interval, the remote memory access causes a violation of accessing the memory address for the current user thread and the remote access time is most recent memory access time based upon the access history; and
    detect the potential violation if the access history shows a remote memory access to the memory address by a remote user thread of the plurality of user threads at a remote access time during a detection interval, the remote memory access causes a violation of accessing the memory address for the current user thread and the remote access time is not the most recent memory access time based upon the access history.

14. The system of claim 8, wherein the memory address includes at least one bit to identify the second buffer.

15. A machine-readable non-transitory storage medium comprising a plurality of instructions that if executed, result in a system:

obtaining current memory access information related to a current memory access to a memory address by a current user thread;

storing the current memory access information in a first buffer associated with a first processing thread by the current user thread based on a portion of the memory address;

switching the first buffer with a second buffer associated with the first processing thread by the first processing thread when the first buffer is full;

determining if a cache includes a cache entry associated with the memory address; and if the cache includes the cache entry associated with the memory address, then analyzing an access history stored in the cache entry and the current memory access information to detect if there is at least one of an actual violation and a potential violation of accessing the memory address.

16. The machine-readable non-transitory storage medium of claim 15, wherein the access history includes memory access information related to a plurality of memory accesses to the memory address, each of the plurality of memory accesses performed by one of a plurality of user threads, wherein the memory access information related to a memory access of the plurality of memory accesses includes one or more from a group comprising time information of the memory access, type of the memory access, memory access length, an identifier of a user thread of the plurality of user threads performing the memory access, and the memory address.

17. The machine-readable non-transitory storage medium of claim 15, wherein the plurality of instructions that result in the system analyzing, further result in the system:

determining if the access history includes a previous memory access information related to a previous memory access to the memory address by the current user thread; and if the memory access information includes the previous memory access information, then determining a detection interval lasting from a previous access time of the previous memory access until a current access time of the current memory access.

18. The machine-readable non-transitory storage medium of claim 15, wherein the plurality of instructions that result in the system analyzing, further result in the system:

detecting the actual violation if the access history shows a remote memory access to the memory address by a remote user thread at a remote access time during a detection interval, the remote memory access causes a violation of accessing the memory address for the current user thread and the remote access time is the most recent time that the memory address is accessed based upon the access history; and detecting the potential violation if the access history shows a remote memory access to the memory address by a remote user thread at a remote access time during a detection interval, the remote memory access causes a violation of accessing the memory address for the current user thread and the remote access time is not most recent time that the memory address is accessed based upon the access history.

19. The machine-readable non-transitory storage medium of claim 15, wherein the plurality of instructions further result in the system: if the cache includes the cache entry associated with the memory address, then adding the current memory access information to the cache entry.

20. The machine-readable non-transitory storage medium of claim 15, wherein the plurality of instructions further result in the system: if the cache does not include the cache entry associated with the memory address, then finding another cache entry of the cache and storing the current memory access information into the another cache entry, if the memory address is within a predetermined memory area; and skipping the current memory access information, if the memory address is not within the predetermined memory area.

21. The machine-readable non-transitory storage medium of claim 15, wherein the memory address comprises at least a bit to identify the second buffer.

\* \* \* \* \*